(No Model.)
D. WHITE & T. M. SIMPSON.
PROCESS OF AND APPARATUS FOR EXTRACTING PRECIOUS METALS FROM SLIMES, &c.
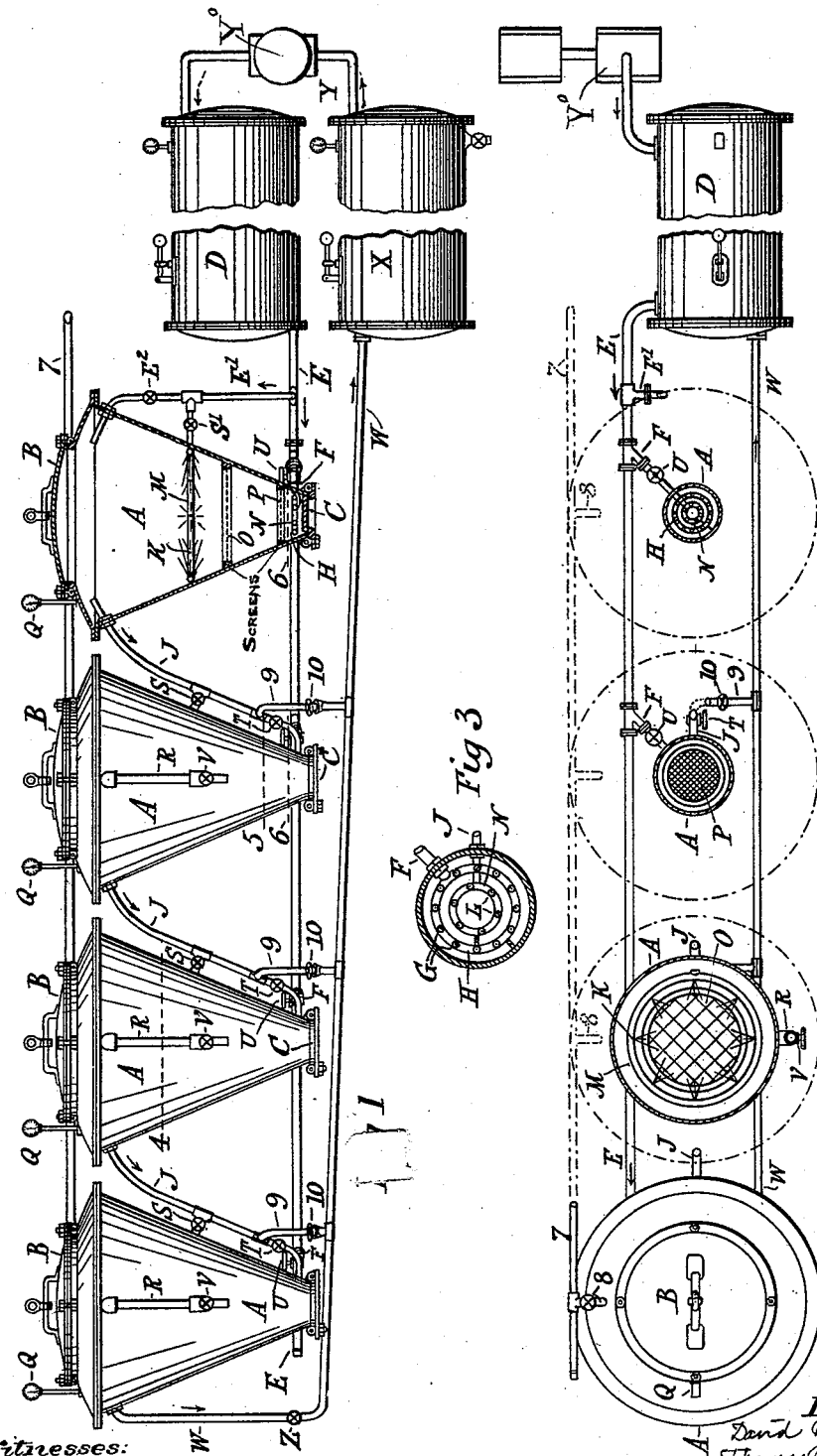

UNITED STATES PATENT OFFICE.

DAVID WHITE AND THOMAS MOORE SIMPSON, OF STAWELL, VICTORIA.

PROCESS OF AND APPARATUS FOR EXTRACTING PRECIOUS METALS FROM SLIMES, &c.

SPECIFICATION forming part of Letters Patent No. 578,178, dated March 2, 1897.

Application filed November 13, 1896. Serial No. 612,018. (No model.)

*To all whom it may concern:*

Be it known that we, DAVID WHITE, engineer, and THOMAS MOORE SIMPSON, metallurgist, subjects of the Queen of the United Kingdom of Great Britain and Ireland, and residents of Stawell, in the Colony of Victoria, Australia, have invented a certain new and Improved Method of and Apparatus for Extracting Precious Metals from Slimes or other Finely-Divided Material Containing the Same, of which the following is a specification.

This invention is one which enables precious metals to be extracted from slimes (a proportion of which is inevitably produced by wet stamping, which is the almost universal method in use for crushing gold ores) in a cheap and profitable manner. We thereby solve a problem which has for a number of years engaged the earnest attention of metallurgists and chemists. Among these is Schiedel, who says, (October, 1894:) "The treatment of slimes or of tailings-pulp containing a high percentage of slimes is still one of the unsolved problems of the cyanid process. At present most of the slimes are washed away and with them a large amount of gold is lost." In 1896 Park published the statements that one of the main obstacles to the success of the cyanid process is the difficulty hitherto met with in the treatment of slimes; that if slimes could be treated finer crushing would be adopted and more gold be thereby extracted; that slimes are extremely prejudicial to leaching, interfering with percolation and washing, are apt to be irregular in distribution, conduce to the formation of channels through the ore, and that so far no satisfactory process of treating them has been offered to the public.

The principal attempts hitherto made to treat slimes on a large scale have been by the use of mechanical stirrers, paddles, screws, or similar locally-moving agitators in some cases supplemented by hand labor and other agencies crudely employed. The wear and tear and other expenses attendant on the use of such appliances have, however, been a bar to practical success, notwithstanding the fact that the slimes are often richer in gold than the sands which are successfully treated by ordinary methods.

Our treatment by circulation takes hours as compared with days required by percolation processes and gives high extraction with marked economy of cyanid.

The excessive disproportion (forty and even sixty to one) between the theoretically necessary (according to Elsner's equation) and the actual consumption of cyanogen in gold extracting is well known. The causes are not entirely ascertained, but the present mode of slow percolation in open vats is one cause, and we find that by our invention the disproportion aforesaid is much reduced. Owing to the rapidity of our treatment, a smaller and less costly plant than an ordinary percolation plant will treat a greater quantity of ore in a given time.

In our invention the whole of the necessary agitation is produced by the passage under special conditions of a gaseous body (hereinafter defined) through the respective vats in which the slimes along with solvent solutions containing cyanid are placed.

While this invention is intended specially for the cyanogen treatment of slimes and alluvial sludges, it is applicable also to the extraction of precious metals from old battery sands, quartz-tailings direct from the mill, whether crushed wet or dry, or other finely-divided material containing the said metals.

In order to further understand this invention, reference should be made to the accompanying drawings, in which the same letters and figures of reference indicate the same parts, and in which—

Figure 1 represents in side elevation, partly sectional, an apparatus for carrying out the same. Fig. 2 shows a plan view, partly sectional, of the same apparatus from above. Fig. 3 shows a detail in plan view upon twice as large a scale as the rest.

In the drawings, A A represent a series of fixed upright vats or high tubs of enameled iron, steel, or other material not objectionably acted upon by the chemicals employed, having each a removable gas-tight lid B at its large upper end and a discharge cock or door C at its small lower end. Vats of pear-shaped or conical form are particularly advantageous, and therefore are represented.

In Fig. 2 one vat is shown in section on the line 4, Fig. 1, another in section on the line 5, Fig. 1, and another in section on the line 6, Fig. 1. Any number of these vats may be used to form the series, according to the quantity of ore to be treated in a given time, while the size of the vats and of the charges of material placed within them may vary as desired to suit different classes of charge. The more granular and porous the ore the greater its bulk may conveniently be, while if exceedingly tenacious and slimy comparatively small charges are employed. When our invention is used, fine crushing is not a drawback, but an advantage, as the extraction of gold will often be then higher. It has indeed hitherto often occurred in crushing ores for cyanid treatment that fine crushing has been carefully avoided. The result in certain cases has been the production of coarse free gold which the weak cyanid solution used failed to entirely dissolve. Fine gold also was left locked up in the gangue, so that it could not be attacked by the solvent.

D represents a receiver of compressed air or other gas or gaseous compound well known to be suitable for the purposes of promoting oxidation and agitation, for we do not confine ourselves to the use of air alone, and for the sake of clearness and brevity this fluid will simply be designated "gas." Also in referring to the medium which passes from one vat to the next by pipes J the term "gaseous mixture" will be used. By this is meant a compound consisting of such gaseous elements as rise through the charge to the top of the vats. The constitution of the compoumd depends upon reactions within the vats after the entry of the gas from the receiver D. This gaseous mixture contains sometimes a considerable amount of hydrocyanic-acid gas, which, being of value in the dissolving of gold, is intentionally saved by our invention instead of being permitted to escape into the atmosphere, as it does where open vats, either with or without any kind of stirrers, are used. At the same time in the course of the process there is much less carbonic-acid gas brought into contact with the cyanogen than occurs with open vats, an amount of objectionable decomposition of cyanid being thus avoided. This receiver may be filled by any suitable means, as by the pump or the compressor Y°, which is not intended to represent any particular form of compressor or pump. A main E (or mains) from D leads (or lead) the contents of the latter, hereinafter called, for shortness, "gas," into the base of each vat A, as by branch pipes F, terminating in a number of small jet-holes within the bottom of the vat. These jet-holes G, Fig. 3, are arranged suitably at short distances apart—for example, as gas-burners are arranged—around a tubular ring H. There is also a series of distinct connecting-tubes J, by which each vat is connected with the next vat in the series, each said tube J leading from the interior of the top of one vat to the interior of the base of the other, or to any suitable other or additional points, ending in, for example, a number of jet-holes (shown by K and L) arranged on rings M and N, respectively, within each vat.

O P represent partitions in the form of gratings, the first having apertures, say, of one foot square each, the second apertures, say, of one to two inches square, the sizes in each case being widely variable.

Q shows a pressure-gage to each vat-head, and R a device, as a glass gage, to show the amount of solution and extent of agitation in each vat.

S and T each represent a series of cocks for regulating admission of the gaseous mixture from one vat to another, U a series of cocks for regulating admission of gas from the supply-main E into each vat, and V a series of cocks for taking samples of the pulp from each vat for assay and for testing the strength of the cyanid solution. A return-main W from the last vat in the series communicates with a second receiver X, into which the gaseous mixture passes and is drawn therefrom in quantities as required by pipe Y, which forms the intake of the compressor or pump.

Z is a cock for stopping circulation of the gaseous mixture through the return-main.

Separate pipes to and from the respective vats may be used instead of single mains, and cocks may be located wherever desired.

The receivers D and X are fitted with gages and suitable valves to reduce superabundant pressure, in the case of receiver X the entry of air being allowed when the pressure within the receiver is below that of the atmosphere.

Without entering minutely into those details of (or into those immaterial variations in) the construction of our apparatus, which persons familiar with processes of gold extraction by cyanid solutions will readily understand, the method of extraction will now be explained.

In using our invention any suitable known solution containing cyanid (but not restricted to that chemical pure and simple, as admixtures are well known to be advantageous in some cases) is first run into the vats A till they are partially filled. The gas is turned on from main E, so as to agitate the solution, and then the caked or pasty slimes or sludge, wet tailings, or the dry finely-divided auriferous materials are introduced into the vats by suitable known means, still taking care to only partially fill the vats. An even initial distribution of slimy ore is totally unnecessary. Even when sludge is dumped in in large semidried compact masses they soon, through the presence of the gratings O and P (which also protect the jet-orifices from injury or choking) and under the influence of the agitation, become disintegrated. If the ores require preliminary alkaline treatment, the same may be given in vats of the same construction by using alkaline solution instead of cyanid solution; but in this description we shall continue to deal with the mode of dissolution of the gold from the ore when it is ready for contact with solution containing cyanid. The vat-covers are fastened on when the auriferous charge has been introduced and circulation of gas and gaseous mixture (through in succession receiver D, any number of vats A, receiver X, the compressor or pump, and then through D again, and so on) is continued until the desired extraction of gold from the ore has been accomplished, the pressure being increased or diminished as required, and being supplied through the jets G, K, and L simultaneously or through only some of them; for instance, through G in the first vat of the series (in the drawings shown nearest to the reservoir D) and through L only or L and K only in the other vats.

The motion in the vats resembles boiling in appearance and effectually removes any films on the gold and exposes surfaces for the cyanogen to attack. The gratings increase the friction, diffuse the agitation, prevent the formation of currents of small area, and cut up the lumps which may exist in the charge. As the extraction under agitation proceeds the more homogeneous and loose the pulp becomes.

When the gold extraction is complete, the pulp may be discharged through the doors or cocks C and filtered, additional wash-water or weak cyanid solution being introduced, as desired. One main 7 for introducing cyanid solution is shown having branch pipes 8. There may be several such mains, by one of which water may be introduced when required. The pulp may, however, (if desired,) be ejected with the assistance of the gaseous mixture by closing the appropriate cocks S and T or Z, which prevents the gaseous mixture leaving the vat to be emptied.

E' is a branch from main E, leading to a ring M and to the interior of the head of the first vat in the series. It has controlling-cocks E² and S', through which gas can be turned into the said vat when desired.

We make no claim to the use of compressed air for filtering purposes, although it is obvious that there may be a filter at the base of each vat A to enable the charge to be leached in the same vessels.

Each of the pipes J is connected by a pipe 9, having cock 10, to the return-main W, so as to allow any one or more of the vats to be shut off temporarily from the circulatory process. This allows emptying, recharging, and other operations without interrupting the continuity of the aforesaid circulation through the remaining vats. This is a matter of considerable practical importance, especially when there are a large number of vats in series, and conduces to economy of power, time, and material. As pipes 9 enable any other or additional vats than the last one in the series to be connected direct to the receiver X, there may be, if desired, more than one circuit going on at the same time.

The amount of power consumed in working our invention will vary with the ore, being much less when the charges are easily permeable, requiring a minimum of solution and of agitation. To economize power, the pressure at gages Q is kept as low as is consistent with the maintenance of sufficient agitation to reduce ore and solution to a homogeneous pulp and to allow the cyanid to attack the gold.

After the extraction of the gold by the solution and before removing the covers B the gaseous mixture may be pumped into the receiver X and there stored under pressure until required to be utilized. A quantity of liquor will often condense and accumulate at the bottom of said receiver, whence it should be drawn from time to time, and when gold is therein it should be recovered. The strength of solution can be easily varied from time to time. For example, it may first be one-half of one per cent. of potassic cyanid, then be increased to one per cent. by adding much stronger solution, and lastly by adding water decreased to one-tenth of one per cent., the strength of the solution being readily ascertained by drawing off a sample from cock V and testing the same.

Having now particularly described and ascertained the nature of our said invention and in what manner the same is to be performed, we declare that what we claim is—

1. In the extraction of precious metals from slimes and other auriferous and argentiferous material, the process which consists in mixing the said material with a cyanid solution out of contact with the atmosphere, then agitating the mixture by passing gas under pressure through the same, then passing gas under pressure together with the gases which arise from the action of the cyanid on the first material through another mixture of cyanid solution and the aforesaid material out of contact with the atmosphere and then drawing off the solution containing the precious metal, substantially as described.

2. In the extraction of precious metals from slimes and other auriferous and argentiferous material, the process which consists in mixing the said material with a cyanid solution in a closed vessel, then agitating the mixture by passing a gas under pressure through the same, then passing gas under pressure, together with the gases arising from the action of the cyanid solution in the said material through another quantity of said material and cyanid solution in a closed vessel, then conveying the gases back to the source of compression and drawing off the solution containing the precious metal and extracting said metal, substantially as described.

3. In apparatus for the extraction of precious metals from auriferous and argentiferous material, the combination with a receiver, of a plurality of conical vats or chambers, having removable covers, discharge-doors at the bottoms, graded perforated partitions in said vats, a perforated pipe in each of said vats near the bottom thereof, a second perforated pipe in the said vats above the aforesaid perforated pipe, a pipe communicating from the upper portion of each vat to the perforated pipes in the adjacent vat and return-pipes from the said vats, substantially as described.

4. In apparatus for the extraction of precious metals from slimes and other auriferous and argentiferous material, the combination with receivers, of a plurality of conical vats or chambers having removable covers, discharge-doors at their bottoms, graded perforated partitions in the said vats, circular perforated pipes in the said vats near the bottoms thereof, another perforated pipe above the aforesaid perforated pipes inside of said vats, a pipe from one of said receivers connected with the said perforated pipes, pipes leading from the upper portion of one vat and communicating with perforated pipes near the bottom and middle of another vat, and return-pipes leading from the said vats to one of the receivers and gages carried by the said vats, substantially as described.

5. In apparatus for the extraction of precious metals from slimes and other auriferous and argentiferous material, a conical vat or chamber, provided with graded perforated partitions, a removable cover, a discharge-door at the bottom, a circular perforated pipe in said vat between said door and the lowest partition, a circular perforated pipe on the same level with and concentric with the aforesaid pipe, a circular perforated pipe mounted in said vat above the top partition, pipes communicating with the upper portion of said vat and with the perforated pipes and gages carried by the said vat, substantially as described.

In witness whereof we have hereunto set our hands in the presence of two subscribing witnesses.

DAVID WHITE.
THOMAS MOORE SIMPSON.

Witnesses:
G. G. TURRI,
E. F. NICHOLLS.